Aug. 8, 1933.  M. P. VUCASSOVICH  1,921,055
METHOD OF AND APPARATUS FOR PREPARING FISH AND FILLETS FOR STORAGE
Filed Aug. 7, 1930
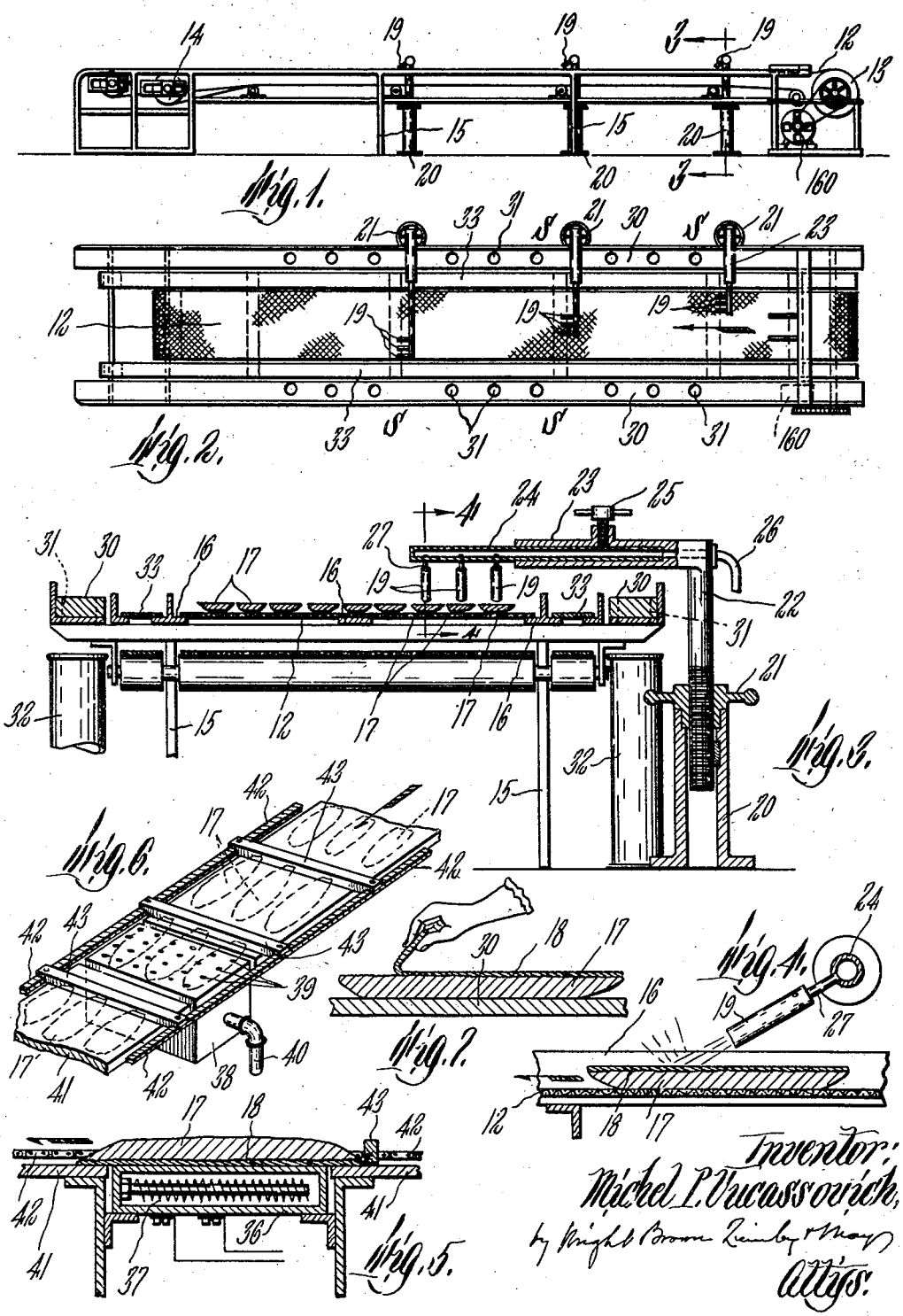

Patented Aug. 8, 1933

1,921,055

UNITED STATES PATENT OFFICE 1,921,055

METHOD OF AND APPARATUS FOR PREPARING FISH AND FILLETS FOR STORAGE

Michel P. Vucassovich, Gloucester, Mass.

Application August 7, 1930. Serial No. 473,721

5 Claims. (Cl. 17—5)

It is now customary to prepare fish fillets for the market by splitting a fish lengthwise, into two substantially equal parts, each constituting a fillet, and then freezing the fillets. It is necessary in preparing a fillet for use, to remove the skin. The removal of the fish skin from the edible portion, either before or after freezing, consumes considerable time and involves waste of the edible matter, because of the tenacious cling of the skin thereto.

I have discovered that by splitting the fish before freezing, without previously removing the skin, freezing both the fillet and the skin, and softening the skin after freezing from its outer to its inner surface by heat, without appreciably softening the edible portion constituting the fillet of commerce, the skin may be quickly stripped from the fillet by hand, without waste, while the fillet remains frozen, the fillet being then prepared for packing, cold storage and use.

My invention consists in the improved method of preparing frozen fish fillets for use, and in apparatus for practising said method, as hereinafter described.

Of the accompanying drawing forming a part of this specification,—

Figure 1 is a side view of a preparing apparatus, whereby steps of my improved method may be practised.

Figure 2 is a top plan view of the same.

Figure 3 is a section on a larger scale, on line 3—3 of Figure 1.

Figure 4 is a fragmentary sectional view, showing one of the heater elements, and a portion of the traveling conveyor shown by Figures 1, 2 and 3, and a fillet on the conveyor.

Figure 5 is a fragmentary sectional view, showing modified forms of the conveyor and heater.

Figure 6 is a fragmentary perspective view, showing other modifications.

Figure 7 is a view illustrating the operation of stripping a softened skin from a frozen fillet.

The same reference characters indicate the same parts in all of the figures.

In practising my improved method I freeze a fish fillet and its skin by any suitable freezing apparatus and prepare the fillet for use, by softening the skin by heat from its outer to its inner surface, without appreciably softening the edible portion constituting the fillet of commerce, and stripping the skin from the fillet while the latter is frozen, the fillet being prepared for use without waste.

The method is preferably practised by maintaining a heated area in a predetermined location, and progressively moving frozen skin-bearing fillets through said area with the skin sides exposed to heat.

Although the method may be practised by manually controlling a frozen skin-bearing fillet while subjecting the skin to heat, I prefer to employ apparatus which includes a traveling conveyor and heaters associated therewith, as hereinafter described.

Referring to Figures 1, 2, 3 and 4 of the drawing, 12 designates a traveling conveyor which is preferably the upper stretch of an endless belt, supported by pulleys 13 and 14, journaled in bearings at opposite ends of a frame, which may include upright standards 15, and spaced-apart horizontal tracks 16 (Figure 3) on which the upper stretch of the conveyor is slidable in a predetermined path.

The conveyor is preferably a wire-mesh belt composed of refractory and rustless material, such as Monel-metal wire. The pulley 13 may be driven by a motor 160, the pulley 14 being idle. A heated area may be maintained in a predetermined location relative to the conveyor by a heater organized in any suitable way, the arrangement being such that a frozen fillet 17, bearing a frozen skin 18, may be subjected to heat in said area until the skin is softened by thawing from its outer to its inner surface, without appreciably thawing the fillet.

The heater in this instance includes a plurality of units, each of which is a Bunsen burner 19, supplied with gas and air, as usual in a burner of this type, there being preferably a burner for each fillet, the fillets being deposited side by side on the conveyor to pass under the burners, as shown by Figure 3. The burners are preferably inclined, as shown by Figure 4, so that the heated area is maintained by inclined burner flames projected toward the stretch 12 and against the skin 18. The heat of the flame and the travel of the conveyor are coordinated, so that the skin is suitably softened during its passage through the heated area. The refractory material of the conveyor prevents injury thereto by heat projected toward it.

The burner units 19 may be vertically adjustable toward and from the conveyor to regulate the heat. Figure 3 shows adjusting means including a fixed standard 20, an adjusting nut 21 engaged with the standard, and a holder composed of a threaded upright arm 22 engaged with the nut, and a horizontal tubular arm 23 projecting over the conveyor. A gas pipe section 24 is adjustably connected by a set screw 25 with the arm 23, and receives gas from a source of supply through a flexible pipe section 26. Each burner 19 includes a gas pipe section 27, communicating with the adjustable section 24. The inclination of the burners may be varied, by turning the section 24 in the arm 23.

As shown by Figure 1, there may be a plurality of heaters, each composed of a group of burners or units 19. Said heaters may be spaced apart lengthwise of the conveyor, and each may be located at a different distance from the edges of the conveyor. The organization is such that operators standing beside the apparatus adjacent the heaters may remove the fillets from the conveyor and strip the softened skins therefrom, each operator handling only the fillets which have been acted on by one of the heater units.

The conveyor shown by Figure 2, is wide enough to permit three heaters to project over it, the heaters being over different zones of the conveyor, so that an operator standing by one heater may handle only the fillets conveyed by the zone under that heater.

The sides of the frame of the apparatus are sufficiently unobstructed to enable operators stationed at the stands designated by S in Figure 2, to strip softened skins from the edible constituents of the fillets.

I provide fixed means at the operators' stands for supporting the frozen fillets while the skins are being manually stripped therefrom, and conveyors for carrying the fillets from said stands to one end of the apparatus.

Supported by the frame are longitudinally extending beds 30, at opposite edges of the conveyor, on either of which an operator may place a fillet with its skin side upward while stripping the skin, as illustrated by Figure 7. The beds are provided with holes 31, in which skins may be dropped into portable containers 32 under said holes. Between the beds 30 and the edges of the conveyor 12, are fillet conveyors 33, which are preferably the upper stretches of endless belts supported and driven by the means supporting and driving the conveyor 12. The conveyors 33 deliver the fillets at one end of the apparatus, where they may be collected and suitably disposed of. While I prefer the Bunsen burner type of heater, I am not limited thereto.

Figures 5 and 6 show heaters each including a box adapted to maintain a heated area to which the skin sides of the fillets may be subjected.

Figure 5 shows a box 36, adapted to contain a liquid, and provided with heating means, such as an electric heating unit or units 37. The skin sides of the fillets are arranged to contact with a side of the box in passing over it.

Figure 6 shows a box 38, having perforations 39 in its top, and receiving steam through a pipe 40, the steam issuing through the perforated top and acting on the skins 18.

Each box top forms a part of a stationary bed on which the fillets are adapted to slide, said bed including a fixed members 41.

The conveyor shown by Figure 6 includes a pair of sprocket chains 42, and spaced-apart cleats or pushers 43 fixed to the chains, the chains and cleats bounding spaces in which the fillets are placed. The movement of the conveyor causes the cleats to push the fillets over the tops of the heaters.

I am enabled by the described method to greatly decrease the time required for skinning fish fillets, or, in other words, to greatly increase the speed of the skinning operation.

It will be seen that the described apparatus shown by Figures 1, 2, 3 and 4 comprises first, an endless conveyor of refractory material having an upper stretch 12 formed and arranged to support and unidirectionally move a procession of previously frozen skin-bearing fish parts, and secondly, groups of preparing elements spaced apart along the upper stretch 12 and coinciding with the operators' stands S, an element of each group being a heater having means for projecting flame toward said stretch in the direction required to soften the skins of fish parts moved thereby. Another element of each group is a fixed bed 30 arranged to support the edible constituent 17 of a skin-bearing fish part while a softened skin 18 is being manually stripped therefrom.

The heater element of each group performs a part of the operation of preparing the frozen fish parts for the removal of the skins from the edible constituents, and the bed element 30 of each group performs another part of said operation by supporting an edible constituent 17, while an operator at a stand S strips off the softened skin after transferring from the stretch 12 to the bed a fish part, the skin of which has been acted on by the heater.

It will be seen that two fixed beds 30 are provided, these being located beside the upper stretch of the conveyor 12, or, in other words, as opposite edges of said stretch.

It will also be seen that the upper stretch and the fixed beds are unobstructed, so that operators may stand in position to remove fish parts from the upper stretch and deposit the same on the beds. Operators located at the stands S are therefore enabled to remove fish parts from different portions of the upper stretch and transfer said parts to the beds before stripping the softened skins from the frozen edible constituents.

I claim:

1. That improvement in the method of preparing a skin-bearing fish or fish fillet for use, which consists in freezing the fillet and its skin, softening the skin by heat without appreciably softening the fillet, and stripping the softened skin from the fillet while the latter is frozen.

2. That improvement in the method of preparing a frozen skin-bearing fish or fish fillet for use, which consists in maintaining a heated area in a predetermined location, freezing the fillet and its skin, progressively moving the frozen skin-bearing fillet through said area with its skin side exposed to heat to soften the skin without appreciably softening the fillet, and stripping the softened skin from the fillet while the latter is frozen.

3. The method of skinning a previously frozen fish or a skin-bearing part thereof, which consists in applying heat to the outer side of the skin of an intensity and for a time sufficient to thaw the skin, but insufficient to thaw the flesh of the fish, and then pulling away the softened skin from the still frozen fish.

4. The method of skinning a previously frozen fish or skin-bearing part of a fish which consists in directing a hot fluid against the outer side of the skin, discontinuing such heat application when the skin has become softened but before the flesh of the fish has appreciably thawed, and then stripping the thawed skin from the still frozen fish.

5. Apparatus for preparing previously frozen skin-bearing fish parts for the removal of the skins from the edible constituents of said parts, said apparatus comprising an endless conveyor of refractory material having an upwardly facing upper stretch formed and arranged to support and unidirectionally move a procession of said parts, heating means arranged to soften the skins of fish parts moved by said upper stretch, and fixed upwardly facing beds located beside the upper stretch and formed to support edible fish parts while softened skins are being manually stripped therefrom, said upper stretch and beds being unobstructed so that operators may stand in position to remove fish parts from different portions of the upper stretch, and deposit the same on the beds.

MICHEL P. VUCASSOVICH.